(12) United States Patent
Akiyama (10) Patent No.: US 8,036,073 B2
(45) Date of Patent: Oct. 11, 2011

(54) STORAGE MEDIUM MANAGING DEVICE, STORAGE MEDIUM MANAGING PROGRAM, AND COMPUTER-READABLE MEDIUM

(75) Inventor: Jun Akiyama, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 493 days.

(21) Appl. No.: 11/988,513

(22) PCT Filed: Jun. 21, 2006

(86) PCT No.: PCT/JP2006/312441
§ 371 (c)(1),
(2), (4) Date: Mar. 13, 2009

(87) PCT Pub. No.: WO2007/010703
PCT Pub. Date: Jan. 25, 2007

(65) Prior Publication Data
US 2009/0180363 A1    Jul. 16, 2009

(30) Foreign Application Priority Data
Jul. 15, 2005    (JP) .................................. 2005-207782

(51) Int. Cl.
*G11B 27/02* (2006.01)
(52) U.S. Cl. .................................. 369/47.13; 369/53.15
(58) Field of Classification Search ................. 369/47.13
See application file for complete search history.

(56) References Cited

U.S. PATENT DOCUMENTS

| | | | | |
|---|---|---|---|---|
| 7,522,502 B2 * | 4/2009 | Fuchiwaki | ................. | 369/53.17 |
| 2001/0030823 A1 | 10/2001 | Denda et al. | | |
| 2001/0033537 A1 * | 10/2001 | Ko et al. | .................... | 369/53.35 |
| 2003/0179669 A1 * | 9/2003 | Takahashi et al. | ......... | 369/47.14 |
| 2004/0076093 A1 | 4/2004 | Kawakami et al. | | |
| 2004/0257933 A1 * | 12/2004 | Takahashi | .................. | 369/47.14 |
| 2005/0123284 A1 * | 6/2005 | Kikuchi et al. | ................ | 386/125 |
| 2005/0152235 A1 * | 7/2005 | Hoshizawa | ................ | 369/30.16 |
| 2006/0050622 A1 * | 3/2006 | So et al. | ..................... | 369/275.1 |

FOREIGN PATENT DOCUMENTS

| | | |
|---|---|---|
| JP | 04-76684 | 7/1992 |
| JP | 04-245072 | 9/1992 |
| JP | 06-131816 | 5/1994 |
| JP | 07-057397 | 3/1995 |
| JP | 07-249261 | 9/1995 |
| JP | 08-293187 | 11/1996 |
| JP | 2001-297530 | 10/2001 |
| JP | 2002-260368 | 9/2002 |

OTHER PUBLICATIONS

International Search Report for Application U.S. Appl. No. PCT/JP2006/312441, mailed Jul. 18, 2006.

* cited by examiner

*Primary Examiner* — Lixi C Simpson
(74) *Attorney, Agent, or Firm* — George W. Neuner; Edwards Angell Palmer & Dodge LLP (57) ABSTRACT

A storage medium managing device is provided which can employ a set of management information containing suitable information from a plural sets of management information contained in the storage medium. An optical disc apparatus (1) manages an optical disc (2) having a plurality of management areas for containing management information with which data is managed and which is recorded in the management areas in a predetermined sequence. The apparatus includes a management information retrieving section (52) for reading the management information in the same sequence as the predetermined recording sequence to retrieve primary management information which is management information that is first retrieved normally.

8 Claims, 8 Drawing Sheets

*Prior Art*

STORAGE MEDIUM MANAGING DEVICE, STORAGE MEDIUM MANAGING PROGRAM, AND COMPUTER-READABLE MEDIUM

TECHNICAL FIELD

The present invention relates to storage medium managing devices for managing management information with which information contained in a storage medium is managed.

BACKGROUND ART

Recent progress of digitization of various information, including image information and sound information, has caused rapid increase in the amount of digital information. In response to the situation, devices are being developed which can record information on optical discs which are suitable storage media for large-capacity, high-density storage.

Optical discs contain image information including, for example, image information taken privately and image information purchased on a network. The information is often valuable to the user. That makes important technology which prevents the information from missing. If the management information with which recording locations, etc. are managed for each piece of information contained in the optical disc is damaged, all information becomes unreadable. It is therefore especially important to prevent management information from missing and repair partially damaged management information.

Such a scheme is disclosed in Japanese Unexamined Patent Publication 7-249261/1995 (Tokukaihei 7-249261; published Sep. 26, 1995). The following will describe the management information repairing method of Tokukaihei 7-249261.

Figure 8:
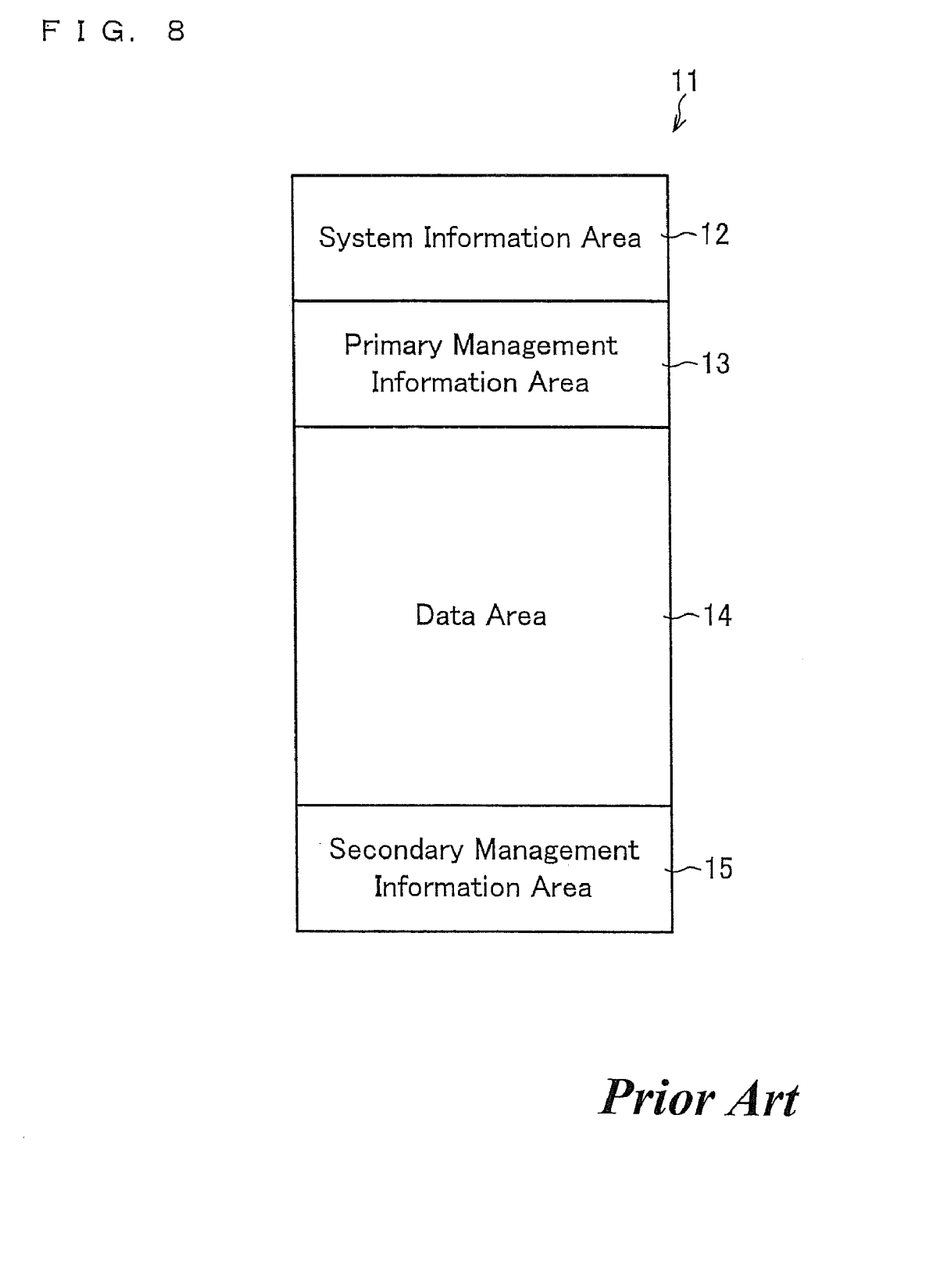
FIG. 8 is a schematic diagram showing a structure of a conventional storage medium.

FIG. 8 is a conceptual diagram showing the structure of a conventional storage medium 11. The conventional storage medium has a plurality of information recording areas: a system information area 12, a primary management information area 13, a data area 14, and a secondary management information area 15. The areas 12 to 15 each contain a different type of information. The "information" here includes system information, primary management information, user information, and secondary management information.

The system information includes, for example, read/write conditions and is needed for a device which writes information on the storage medium to correctly perform various controls.

The user information is information recorded by users: for example, image information and program information.

The primary and secondary management information is information with which recording locations, etc. of each piece of the user information on the storage medium and defective areas of the storage medium are managed. Note that the primary management information typically has the same content as the secondary management information.

According to the conventional scheme, the primary management information is updated when user information is altered or added. The secondary management information is updated based on the primary management information if neither recording nor reading is done for a certain period of time or the main power supply for an information recording device is turned off.

When the main power supply for the information recording device is turned on, it is checked whether or not the primary management information can be normally read. If an reading error is detected, the primary management information is replaced with the secondary management information to restore the primary management information.

Recording the management information at two different locations in this manner makes it possible to restore the primary management information from the secondary management information even if the primary management information becomes unreadable.

However, if one of the sets of management information becomes unreadable due to a scratch, defect, etc., there remains only one set (either the primary or the secondary). That greatly reduces effects of preventing missing management information.

Tokukaihei 7-249261 suggests a solution to this problem. The document suggests to record the management information at three different locations and employ the individual sets of management information by decision of majority, to improve on the precision of the management information.

DISCLOSURE OF THE INVENTION

The "decision of majority" scheme however does not necessarily ensure employment of a correct set of management information. As an example, assume that only one of the three sets of management information was updated and after that, there occurred an unexpected power failure occurred. An "unexpected power failure" refers to a blackout, the power supply cord being accidentally pulled off, and other unforeseeable situations after which the information recording device can no longer operate. In a case like this, there is only one correct set of management information; the other two sets are non-updated, old management information. There are more old sets of information than the latest set. If a majority version of the information is employed, an old version is employed.

The present invention, conceived to solve these problems, has an objective of providing a storage medium managing device and method which is capable of employing a suitable one of plural sets of management information.

The storage medium managing device in accordance with the present invention, to solve these problems, is characterized in that it is a storage medium managing device for managing a computer-readable storage medium having a plurality of management areas for containing management information with which data recorded in the storage medium is managed and which is recorded in the management areas in a predetermined sequence. The device includes retrieving means for reading the management information in the same sequence as the predetermined recording sequence to retrieve primary management information which is management information that is first retrieved normally.

The storage medium typically contains management information which is information indicative of recording locations, etc. of the data contained in the storage medium. Some storage media have a plurality of areas (management areas) containing the management information. Some storage media have a predetermined sequence in which the management information is recorded in more than one management areas. For example, there is a disc which has three management areas (first, second, and third) and allows management information to be recorded in the sequence of the first, the second, and then the third management area.

If the plural sets of management information are all normally recorded or updated in these storage media, all the sets of management information have the same content. In contrast, if some trouble occurs in the course of recording or updating the plural sets of management information and interrupts the management information recording or updating operation, the management information recorded or updated before the trouble has different content from the management information not recorded or updated due to the trouble.

Considering these situations, it is safely assumed that management information older in the recording sequence contains more suitable content.

According to the arrangement, the retrieving means reads the plural sets of management information contained in the storage medium in the same sequence as the predetermined recording sequence. In other words, the retrieving means reads a set of management information which is likely to have suitable content first before other sets and retrieves the management information that is first read normally (primary management information).

Therefore, a particular set of management information that can be safely regarded as being the most suitable is employed from the plural sets of management information.

A recording sequence is not the sequence in which the sets of management information were actually recorded, but a predetermined recording sequence. Generally, the predetermined recording sequence is identical to the sequence in which the sets of management information were actually recorded. When trouble occurs, however, the predetermined recording sequence may differ from the sequence in which the sets of management information were actually recorded. When that is the case, the management information is read in the predetermined recording sequence.

If trouble occurs and the management information is read in the sequence in which the management information was actually recorded, the set of management information which was not updated due to the trouble is the oldest set of management information, and this old, unsuitable set of management information is employed as the primary management information. Therefore, it is important to read management information in a predetermined recording sequence, not the sequence in which the management information was actually recorded.

If the N-th set of management information is not normally read due to scratches or defects of the storage medium, the (N+1)-th set of management information is read.

As described in the foregoing, the storage medium managing device in accordance with the present invention is adapted to be a storage medium managing device for managing a storage medium having a plurality of management areas for containing management information which was recorded in a predetermined sequence. The device includes retrieving means for reading the management information in the same sequence as the recording sequence and retrieves primary management information which is management information that is first read normally.

Therefore, a particular set of management information that can be safely regarded as being the most likely to contain suitable information is employed from the plural sets of management information contained in the storage medium.

REFERENCE NUMERALS

1 Optical Disc Apparatus (Storage Medium Managing Device)
2 Optical Disc (Storage Medium)
23 First Management Information Recording Area (Management Area)
24 Second Management Information Recording Area (Management Area)
25 Third Management Information Recording Area (Management Area)
26 Fourth Management Information Recording Area (Management Area)
51 Recording Section (Recording Means)
52 Management Information Retrieving Section (Retrieving Means)
53 Management Information Correcting Section (Correcting Means)
54 Inspecting Section (Inspecting Means)
55 Correcting Section (Correcting Means)
56 Old/New Determining Section (Comparison Means)

BEST MODE FOR CARRYING OUT THE INVENTION

Embodiments

The following will describe an embodiment of the present invention in reference to FIGS. 1 to 7.

The storage medium managing device of the present invention is likely to be manufactured as part of an information read/write apparatus, rather than as the device by itself. Accordingly, the present embodiment will take as an example an optical disc apparatus (optical information read/write apparatus) 1 which includes the storage medium managing device of the present invention as one of components.

Structure of Optical Disc 2

First, storage media that can be used with the optical disc apparatus 1 of the present embodiment will be described in reference to FIG. 2.

The storage medium preferred for use with the optical disc apparatus 1 is a computer-readable storage medium having a plurality of management areas for containing management information with which data recorded in the storage medium is managed and which is recorded in the management areas in a predetermined sequence. The present embodiment will take an optical disc 2 as an example of such storage media for descriptive purposes.

Figure 2:
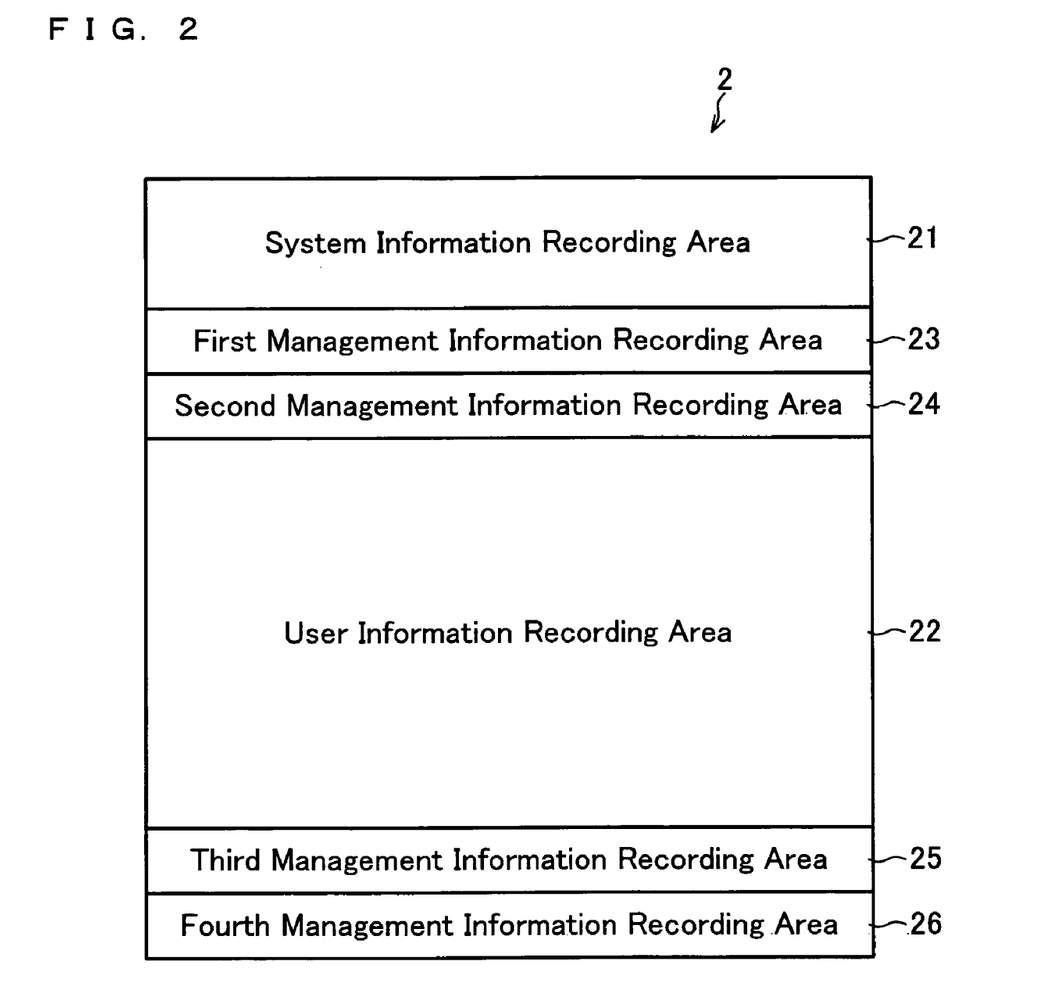
FIG. 2 is a schematic diagram showing the structure of an optical disc used with an optical disc apparatus of an embodiment.

FIG. 2 is a schematic diagram showing the structure of the optical disc 2 used with an optical disc apparatus 1 of the present embodiment.

As shown in the figure, the optical disc 2 includes a system information recording area 21, a user information recording area 22, a first management information recording area 23, a second management information recording area 24, a third management information recording area 25, and a fourth management information recording area 26.

The system information recording area 21 contains system information which the optical disc apparatus 1 needs to correctly perform various controls. The system information is, for example, read/write conditions.

The user information recording area 22 contains user information which is recorded by the user. The user information may be text information, image information, program information, and any other kind of information.

The management information recording areas 23 to 26 (management areas) each contain management information and typically called a DMA (defect management area or disk management area). The management information is, for example, information on recording locations of the user information (i.e., where the user information is stored on the optical disc 2) and defect management information on the locations of defective areas of the optical disc 2. Each management information recording areas 23 to 26 also contains information on the update date and time of the management information.

All the four management information recording areas 23 to 26 contain the same management information. In the following, the four copies of the management information recorded in the management information recording areas 23, 24, 25, 26 will be referred to as the first, second, third, and fourth management information respectively. These ordinal numbers will be referred to as the "numbers" of the management information.

The optical disc 2 has four management information recording areas because by so doing, the disc 2 is geared to lower the possibility of management information missing. Therefore, there is no need to limit the design to four management information recording areas. Instead, there may be provided at least two of such areas. Aiming at lowering the possibility of management information missing and maintaining the performance of the information recording device, however, the present embodiment provides four management information recording areas.

Structure Of Optical Disc Apparatus 1

Figure 1:
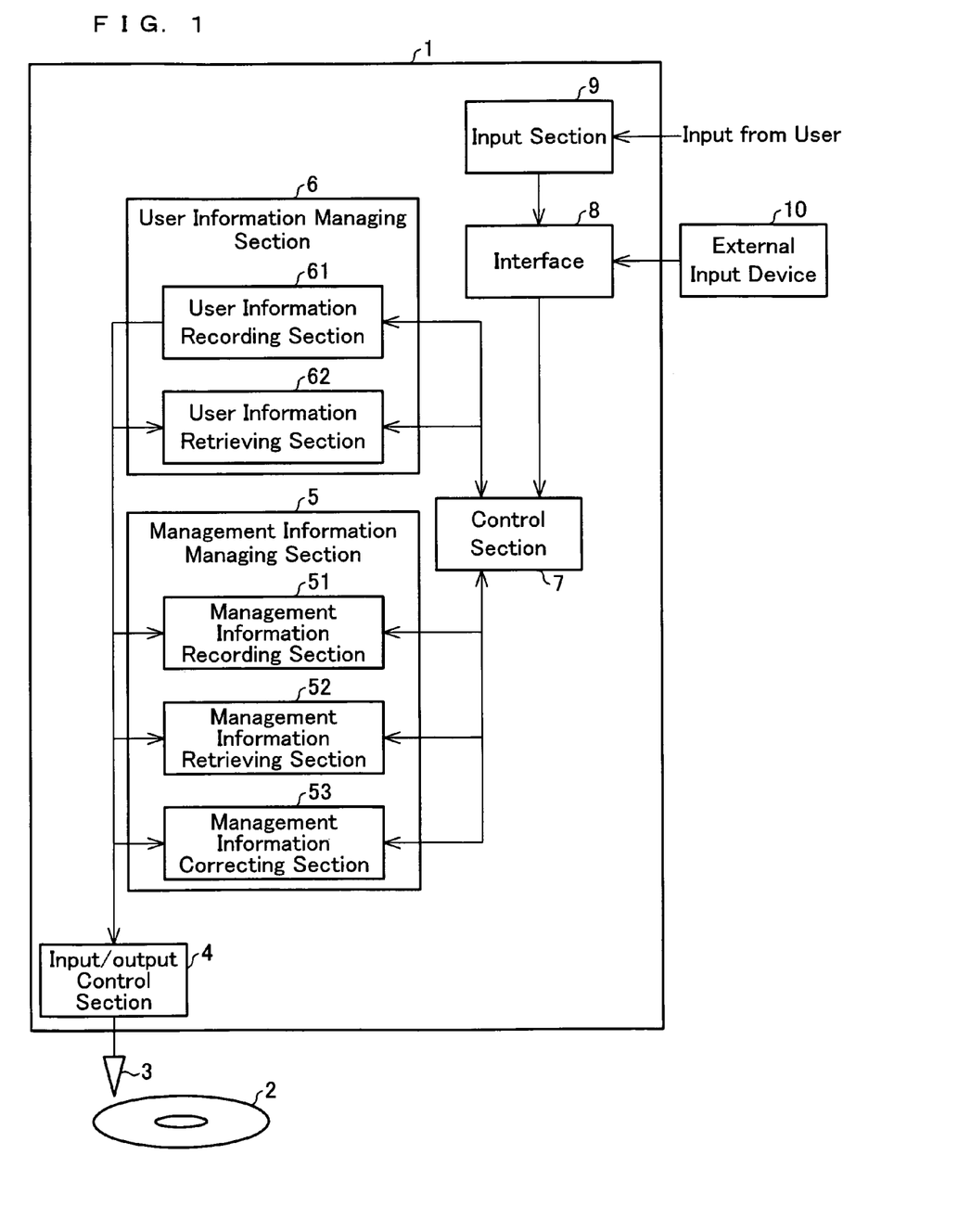
FIG. 1 is a schematic diagram showing the structure of an optical disc apparatus of an embodiment.

Now will be described the structure of the optical disc apparatus 1 in reference to FIGS. 1 and 3. FIG. 1 a schematic diagram showing the structure of the optical disc apparatus 1 of the present embodiment.

Referring to FIG. 1, the optical disc apparatus 1 includes a drive 3, an input/output control section 4, a management information managing section 5, a user information managing section 6, a control section 7, an interface 8, and an input section 9. The drive 3 is provided to access the optical disc 2.

The input/output control section 4 controls the drive 3 in accordance with a read instruction or a write instruction from the management information managing section 5 or the user information managing section 6, so as to read/write information on the optical disc 2.

The input section 9 receives and transfers user commands to the control section 7 via the interface 8.

The interface 8 receives information from an external input device 10 as well as the user commands and supplies the information and commands onto the control section 7.

The control section 7 controls the user information managing section 6 and the management information managing section 5 in accordance with the user commands and controls the management information managing section 5 at predetermined timings.

The user information managing section 6, provided with a user information recording section 61 and a user information retrieving section 62, writes the user information onto the optical disc 2 and reads the user information from the optical disc 2, both by using the input/output control section 4 and the drive 3 under the control of the control section 7.

Upon receiving a user information write command and the user information to be written from the control section 7, the user information recording section 61 writes the user information to the user information recording area 22 on the optical disc 2.

The user information retrieving section 62, upon receiving from the control section 7 a user information retrieve command for retrieving a particular set of information, retrieves the particular set of user information from the optical disc 2 in accordance with the management information.

The management information managing section 5 manages the management information for the optical disc 2 using the input/output control section 4 and the drive 3 under the control of the control section 7 and includes a management information recording section 51 (recording means), a management information retrieving section 52 (retrieving means), and a management information correcting section 53 (correcting means).

Upon receiving a management information write command and the management information to be written from the control section 7, the management information recording section 51 writes the management information to the individual management information recording areas in the sequence of the first management information recording area 23, the second management information recording area 24, the third management information recording area 25, and the fourth management information recording area 26.

Upon receiving a management information retrieve command from the control section 7, the management information retrieving section 52 reads the management information from the four management information recording areas 23 to 26 in the same sequence as the areas 23 to 26 were written. The management information retrieving section 52 supplies the first set of management information that is read normally to the user information retrieving section 62.

Figure 3:
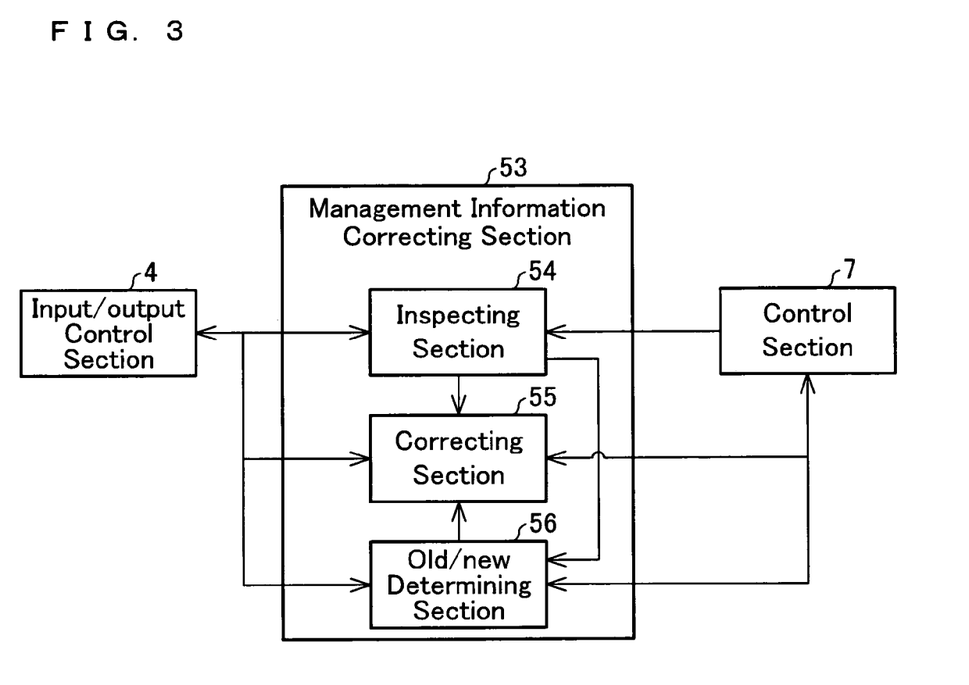
FIG. 3 is a schematic diagram showing the structure of a management information correcting section provided in an optical disc apparatus of an embodiment.

FIG. 3 is a schematic diagram showing the structure of the management information correcting section 53.

Referring to FIG. 3, the management information correcting section 53 includes an inspecting section 54 (inspecting means), a correcting section 55 (correcting means), and an old/new determining section 56 (comparison means). Upon receiving a management information correction command from the control section 7, the section 53 corrects the management information contained in the four management information recording areas 23 to 26 with a predetermined method. The correcting method will be detailed later.

The inspecting section 54 inspects, in accordance with a management information correction command from the control section 7, whether or not the management information was normally read from the management information recording areas 23 to 26. If the management information was not normally read, the inspecting section 54 issues to the correcting section 55 a correction command for correcting the management information that was not normally read. Meanwhile, if the management information was normally read, the inspecting section 54 outputs information on the update date and time of the management information to the old/new determining section 56.

The old/new determining section 56 compares the update date and time of the management information, retrieved normally, that bears the smallest "number" (hereinafter, the "primary management information") to the update date and time of the management information other than the primary management information. The old/new determining section 56 designates, as the correction object, the management information that was updated before the update date and time of the primary management information and issues to the correcting section 55 a correction command for correcting the management information of the correction object.

The correcting section 55 corrects the management information according to the correction commands issued by the inspecting section 54 and the old/new determining section 56.

Management Information Recording Flow

Next will be described a management information recording flow in the optical disc apparatus 1. Management information could be written either to an empty management information recording area or by overwriting the management information that is already there. The following will describe the latter case.

When new user information is added or the old user information is altered, the management information recording section 51 updates all of the four sets of management information in the management information recording areas 23 to 26 in the same manner. In so doing, the management information recording section 51 records new management information to the management information recording areas in ascending order of the management information recording area number.

The update timing of the management information is not especially limited. The management information may be updated immediately after the user information is altered. Alternatively, the updated management information may be temporarily stored in a semiconductor memory (not shown) provided in the management information recording section 51 and transferred to the management information recording areas 23 to 26 sometime later.

If the management information is updated immediately, the changes to the user information are always reflected in the management information for the optical disc 2. Should an unexpected power failure occur, the user information is unlikely to go missing. If new user information is frequently added or the old user information is frequently altered, processing speed could slow down due to a requirement for an access to the four management information recording areas every time such a requirement occurs.

On the other hand, if the management information is not updated immediately and written only at predetermined timings, only the semiconductor memory needs to be rewritten until the information is recorded to the management information recording area. The management information recording area is less often accessed, which prevents processing speed from falling. In that case, however, the management information stored temporarily in the semiconductor memory could be lost due to an unexpected power failure and other causes. If the management information is lost, at least the user information that is associated with the lost part of the management information cannot be retrieved. Therefore, the management information should be updated immediately after a change if priority is given to the prevention of missing user information.

Management Information Retrieving Flow

Figure 4:
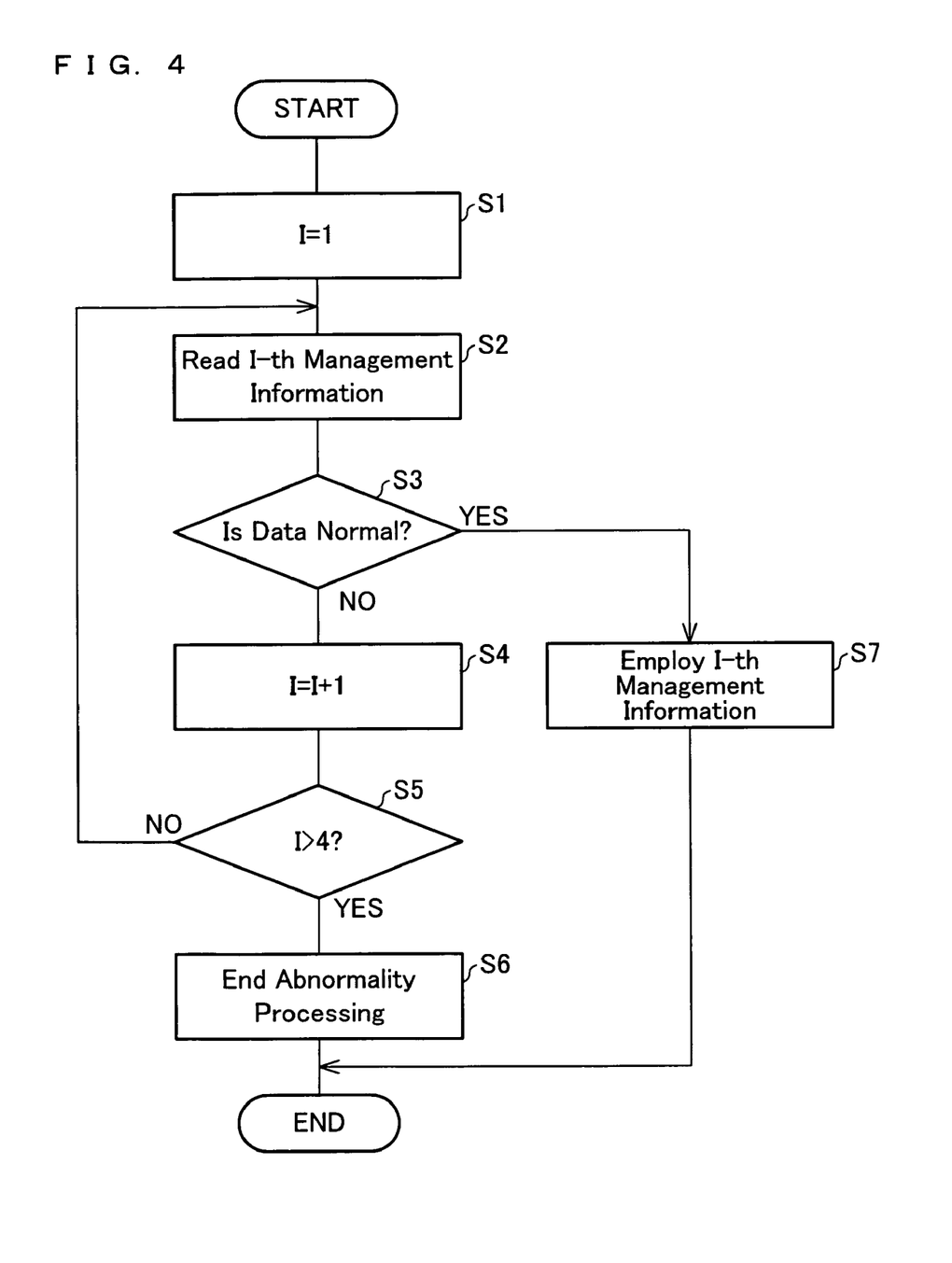
FIG. 4 is a flow chart illustrating a process of an embodiment in which an optical disc apparatus reads management information.

Next will be described a management information retrieving flow in the optical disc apparatus 1 in reference to FIG. 4 which is a flow chart illustrating a management information retrieving flow in the optical disc apparatus 1.

As the optical disc 2 is loaded into the optical disc apparatus 1, the control section 7 issues a management information retrieve command to the management information retrieving section 52.

Upon receiving the management information retrieve command, the management information retrieving section 52 sets a counter (not shown) to 1 (S1) and reads the first management information from the management information recording area 23 (S2). As part of the reading step, the section 52 determines from the outcome of ECC (error correcting code) whether or not the first management information has been normally read out.

If the first management information has been normally read (YES in S3), the management information retrieving section 52 outputs the first management information to the user information retrieving section 62 (S7), thereby ending the process.

On the other hand, if the first management information has not been normally read (NO in S3), the management information retrieving section 52 then increments the counter by 1 (S4). If the counter reading is 4 or less (NO in S5), the process returns to S2 to read a next set of management information (here, the second set of management information). On the other hand, if the counter reading is greater than 4 (YES in S5), meaning that the management information has not been normally read, the management information retrieving section 52 outputs abnormality information indicative of the abnormality to the control section 7.

Upon receiving the abnormality information, the control section 7 carries out abnormality termination, for example, ejects the optical disc 2 (S6), to abort the retrieving flow.

With this method, the first to fourth sets of management information are read in the same sequence as they were recorded, and the first set of management information of the four that is normally read is employed. Thus, a set of management information that is likely to contain suitable content is employed before the others. If there is a set of management information that contains unsuitable content, the unsuitable management information is likely to be skipped.

Management Information Correcting Flow

Figure 5:
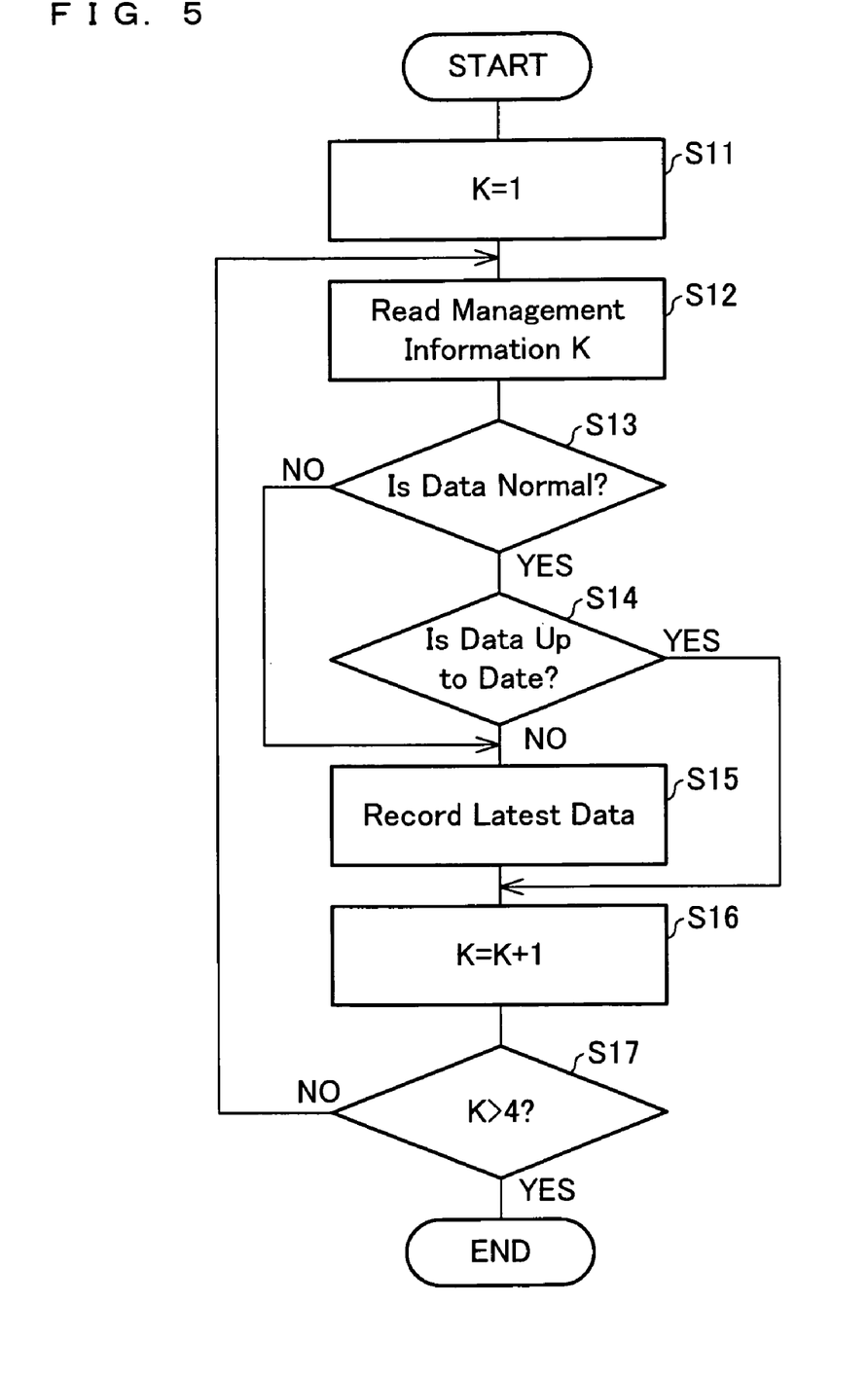
FIG. 5 is a flow chart illustrating a process of an embodiment in which an optical disc apparatus corrects management information.

Next will be described a management information correcting flow in the optical disc apparatus 1 in reference to FIG. 5 which is a flow chart illustrating a management information correct process in the optical disc apparatus 1.

At a predetermined time, for example, after the termination of the retrieving flow, the control section 7 issues a management information correction command to the inspecting section 54 in the management information correcting section 53.

Upon receiving the management information correction command, the inspecting section 54 sets a counter (not shown) to 1 (S11) and reads the first management information from the management information recording area 23 (S12). As part of the reading step, the section 54 determines from the outcome of ECC (error correcting code) whether or not the first management information has been normally read out.

If the first management information has been normally read (YES in S13), the inspecting section 54 outputs information on the update date and time of the first management information, which is the primary management information, to the old/new determining section 56.

On the other hand, if the first management information has not been normally read (NO in S13), the inspecting section 54 issues to the correcting section 55 a correction command for correcting the first management information.

The inspecting section 54 then increments the counter by 1 (S16). If the counter reading is 4 or less (NO in S17), the process returns to S12 to read a next set of management information (here, the second set of management information). On the other hand, if the counter reading is greater than 4 (YES in S17), the reading/inspection of management information is terminated.

Upon receiving the information on the update date and time of the first management information, the old/new determining section 56 records the update date and time as a reference update date and time into a memory (not shown). The section 56 then compares the update date and time of the management information supplied from the inspecting section 54 (hereinafter, "update date and time under consideration") to the reference update date and time.

If the update date and time under consideration is the same as or newer than the reference update date and time (YES in S14), the old/new determining section 56 determines that there is no need to correct the management information having the update date and time under consideration. The update date and time under consideration that is "newer than" the reference update date and time occurs if the (N+1)-th set of management information has a newer update date and time than the N-th set of management information because of a time lag produced during the course of the sequential recording of the management information.

If the update date and time under consideration is far newer than the reference update date and time, the old/new determining section 56 may recognize it as an abnormality and records the update date and time under consideration as a new reference update date and time because the management information in normal situations is recorded with time lags no longer than several seconds.

On the other hand, if the update date and time under consideration is older than the reference update date and time (NO in S14), the old/new determining section 56 issues to the correcting section 55 a correction command of correcting the management information having the update date and time under consideration in accordance with the primary management information.

Upon receiving the correction commands from the inspecting section 54 and the old/new determining section 56, the correcting section 55 corrects the management information that is the correction object in accordance with the primary management information (S15). This correction wraps up the process.

By comparing the update date and time of the primary management information to the update date and time of the other versions of management information, the method identifies older versions of the management information than the primary management information and corrects only the older versions of the management information in accordance with the primary management information. Thus, the method requires less processing in the correction than correcting all the versions of the management information in accordance with the primary management information.

In the correction of the management information that is the correction object in accordance with the primary management information, the management information that is the correction object may entirely be overwritten with the primary management information or partly be overwritten with part of the primary management information.

In addition, the correction is preferably carried out immediately after the retrieval of management information. The correction could be carried out after a period of time, but the correction cannot becomes impossible once the optical disc 2 is ejected from the optical disc apparatus 1 in that period. For example, if an optical disc for which only the first management information is normal is damaged by scratches or dust, or for other reasons, so that the first management information is also unreadable, the whole optical disc becomes unreadable. Therefore, preferably, the correction is done as soon as possible.

As described in the foregoing, the storage medium managing method of the present invention is a storage medium managing method of managing a computer-readable storage medium having a plurality of management areas for containing management information with which data recorded in the storage medium is managed and which is recorded in the management areas in a predetermined sequence. The method involves a management information recording step of reading the management information in the same sequence as the management information were recorded and retrieving primary management information which is management information that is first normally read.

The storage medium managing method preferably involves a correcting step of correcting at least a set of management information other than the primary management information according to the primary management information.

EXAMPLES

Suppose, as an example, occurrence of an unexpected power failure after the first management information is recorded in the management information recording step. When that is the case, it is only the first management information which correctly corresponds to the user information; the second to fourth management information remains the same as the old version of management information.

As the optical disc 2 in the foregoing state is loaded into the optical disc apparatus 1, first, the first management information is read. If the first management information is normally read, the first management information becomes the primary management information and is used later in the retrieval of the user information. The second to fourth management information is ignored.

In this manner, the sequence in which a plural sets of management information are recorded is specified. Therefore, of the management information which was retrieved in the same sequence as the information were recorded, the management information that is first normally retrieved can be readily identified as the latest management information. That eliminates the need for comparison of information between the individual sets of management information and the "decision of majority" process.

If the optical disc 2 in the above state is to be subjected to a management information correction, the update date and time of the first management information and the update dates and times of the second, third, and fourth management information are individually compared. Since the update dates and times of the second, third, and fourth management information are older than the update date and time of the first management information, the information on the second to fourth management information is corrected according to the first management information so that all the management information is up to date.

Variation Example of Old/new Determining Section 56

In the aforementioned description, the old/new determining section 56 determines the chronology of management information by comparing the update dates and times of the management information. Alternatively, the chronology may be determined according to information other than the update dates and times. For example, a comparison may be made between the content of the management information.

Specifically, the content of the primary management information may be compared to the content of the other versions of management information. If a version of management information is found which contains different content than the content of the primary management information, that version is designated as a correction object. This method has an advantage that it requires no additional special information in determining the chronology.

In the method, not all the content needs to be compared; only part of the content may be compared for better performance.

An update count may be assigned to each version of management information for comparison of the update counts. An update count is a number incremented by one every time the content of management information is updated.

If the management information is updated normally, all the versions of management information share the same update count. If there is a version of management information that was not updated for any trouble, the update count of that version is smaller than that of a normally updated version by one. Therefore, the version of management information that has a smaller update count than the update count of the primary management information is designated as a correction object.

The method requires less processing in the comparison than comparing all the content of different versions of management information.

Variation Example of Optical Disc 2

Repairing of management information is very important and therefore be preferably given priority. For example, even if the disc is write-protected, the management information is preferably repairable.

Many optical discs can be write-protected. Generally, write-protection prohibits additions and changes to user information. If a disc is write-protected, the management information cannot be repaired. However, the management information is preferably repairable on a write-protected optical disc.

Accordingly, the optical disc apparatus 1 is preferably capable of repairing management information on a write-protected optical disc. The following will describe such a process.

Figure 6:
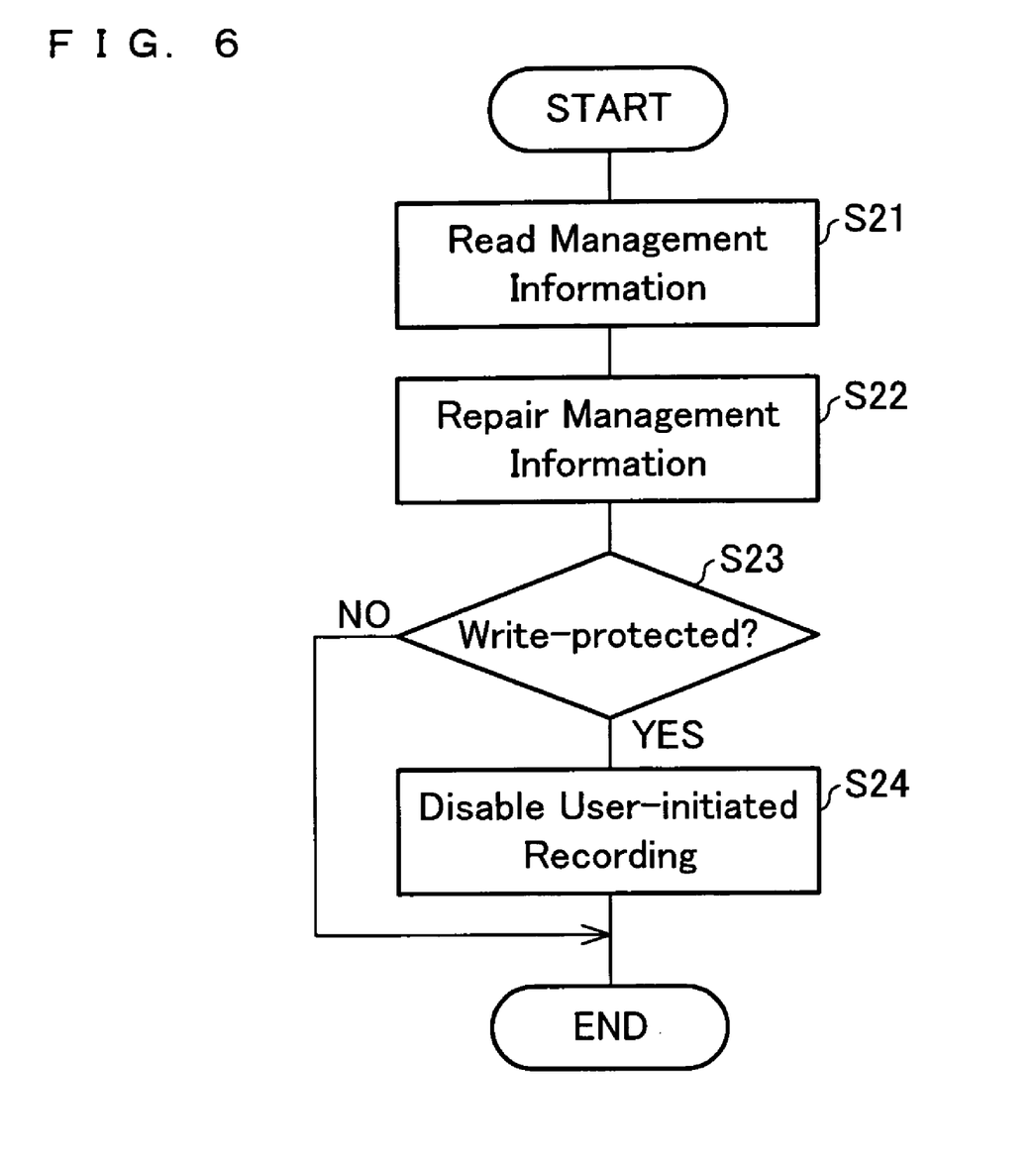
FIG. 6 is a flow chart illustrating a process of an embodiment in which an optical disc apparatus corrects the management information of a write-protected storage medium.

FIG. 6 is a flow chart illustrating a process in which the optical disc apparatus 1 corrects the management information of the write-protected optical disc 2.

As shown in FIG. 6, first, as the optical disc 2 is loaded into the optical disc apparatus 1, the management information retrieving section 52 reads the management information (S21), and the management information correcting section 53 repairs the management information (S22).

The control section 7 then check whether the optical disc 2 is write-protected (S23). If it is write-protected (YES in S23), the apparatus 1 prohibits user-initiated recording to the optical disc 2 (S24).

A write-once optical disc, once closed, does not allow additional recording of user information. The user information is preferably repairable even in such a state, similarly to the cases of write-protected optical discs, provided that other conditions allow. That enables maximum prevention of the user information from missing. A write-once optical disc does not allow rewriting; management information can be written only in unwritten management information recording areas.

Figure 7:
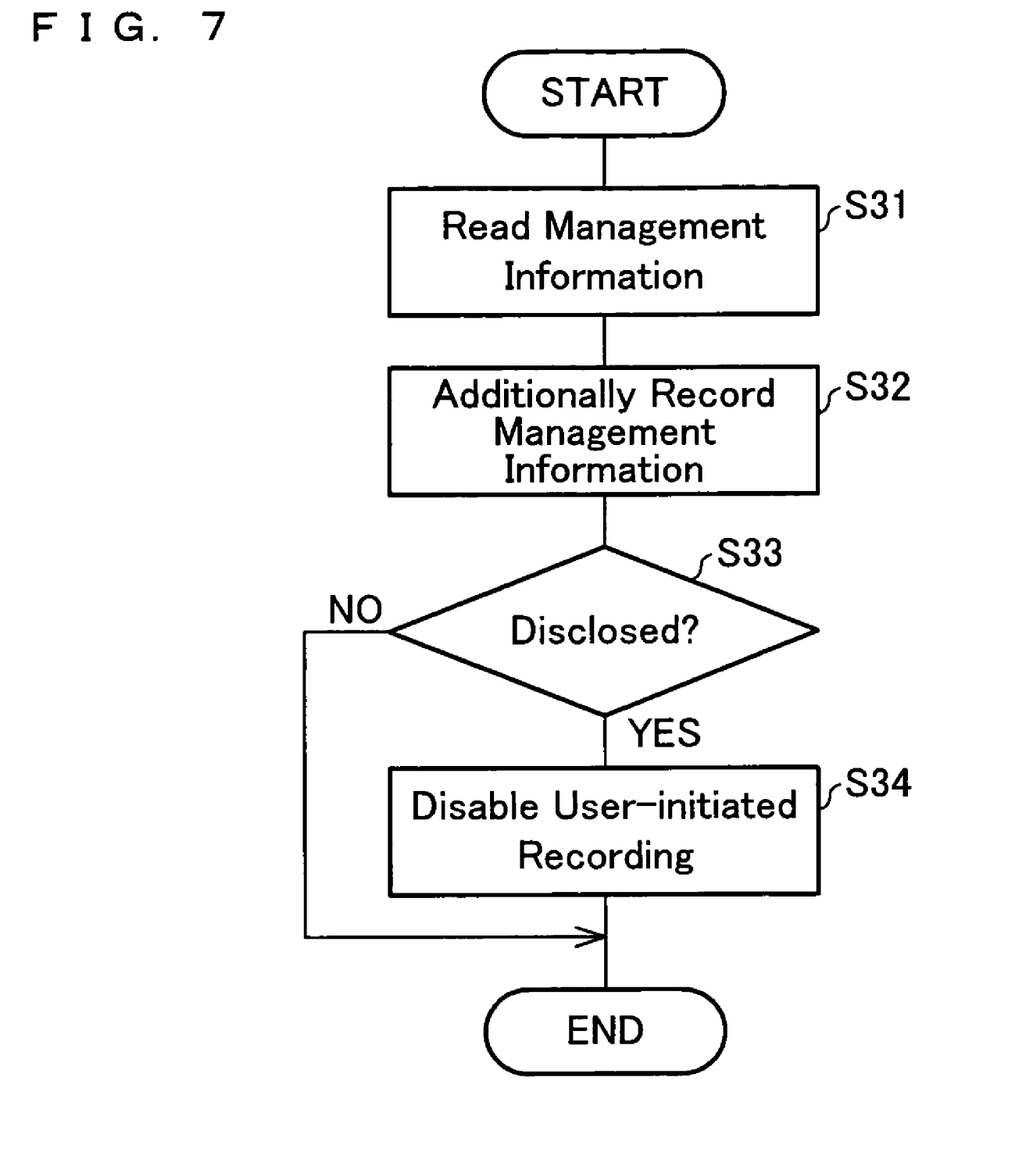
FIG. 7 is a flow chart illustrating a process of an embodiment in which an optical disc apparatus corrects the management information of a closed write-once optical disc.

FIG. 7 is a flow chart illustrating a process in which the optical disc apparatus 1 corrects the management information of a closed write-once optical disc.

As shown in FIG. 7, first, as the optical disc 2 is loaded into the optical disc apparatus 1, the management information retrieving section 52 reads the management information (S31) and outputs primary management information and information on management information recording areas containing no management information to the control section 7.

If there is a management information recording area containing no management information, the control section 7 issues an additional recording command to the management information recording section 51.

Upon receiving the additional recording command, the management information recording section 51 records the primary management information to that management information recording area (S32).

The control section 7 then checks whether the optical disc 2 has been closed (S33). If it has been closed (YES in S33), the section 7 prohibits user-initiated recording to the optical disc 2 (S34).

As described in the foregoing, the management information repairing method of the present embodiment is a method of repairing management information with which data recorded in a storage medium is managed. According to the method, prior to detecting whether or not the storage medium is write-protected, it is detected whether or not there is unsuitable management information. If there is found unsuitable management information, a step is performed in which the unsuitable management information is repaired.

The management information additional recording method of the present embodiment is a method of additionally recording management information with which data recorded in a write-once optical disc is managed. According to the method, prior to detecting whether or not the optical disc is closed, it is detected whether or not there is management information to be additionally recorded. If there is found management information to be additionally recorded, a step is preformed in which the management information is additionally recorded.

It is the control section 7 that performs the step of detecting whether or not the storage medium is write-protected and the step of detecting whether or not the optical disc is closed. It is the management information correcting section 53 that performs the repairing step. It is the management information retrieving section 52 and the management information recording section 51 that perform the additional recording step.

The arrangement lowers the possibility of management information missing by repairing the management information even if the medium is write-protected.

Any method may be used to prohibit the user from recording to the optical disc 2. For example, the control section 7 may be prohibited from sending a user information write command to the user information recording section 61. Alternatively, the functions of the user information recording section 61 may be restricted.

Other Variation Examples

The present invention is not limited to the description of the embodiments above, but may be altered by a skilled person within the scope of the claims. An embodiment based on a proper combination of technical means disclosed in different embodiments is encompassed in the technical scope of the present invention.

For example, the management information retrieving section 52 and the inspecting section 54, which have been so far described as individual members, may be arranged as a single functional block.

The storage medium for use with the storage medium managing device of the present invention is not limited to optical discs. The medium may be a floppy® disk, hard disk, other magnetic disk.

The storage medium managing method of the present invention is a method of reading/writing an information storage medium having three or more information storage medium management information areas which are written in a specified sequence. According to the method, the information storage medium management information areas are read in the same sequence as they were written, and the first normally detected information storage medium management information is copied to another information storage medium management information.

The other information storage medium management information may be information storage medium management information indicating a detection of a defect.

The other information storage medium management information may be information storage medium management information having old content.

The storage medium managing method may compare update information contained in the information storage medium management information to determine if the information storage medium management information is up to date or not.

Finally, the blocks of the optical disc apparatus 1, in particular, the management information managing section 5, the user information managing section 6, and the control section 7, may be realized by hardware or software executed by a CPU as follows:

The optical disc apparatus 1 includes a CPU (central processing unit) and memory devices (storage media). The CPU executes instructions contained in control programs, realizing functions. The memory devices may be a ROM (read-only memory) which contains programs, a RAM (random access memory) to which the programs are loaded, or a memory containing the programs and various data. The objective of the present invention can be achieved also by mounting to the optical disc apparatus 1 a computer-readable storage medium containing control program code (executable programs, intermediate code programs, or source programs) for the optical disc apparatus 1, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy® disk or a hard disk, or an optical disc, such as CD-ROM/MO/MD/DVD/CD-R; a card, such as an IC card (memory card) or an optical card; or a semiconductor memory, such as a mask ROM/EPROM/EEPROM/flash ROM.

The optical disc apparatus 1 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, a wired line, such as IEEE 1394, USB, electric power line, cable TV line, telephone line, or ADSL; or wireless, such as infrared (IrDA, remote control), Bluetooth®, 802.11 wireless, HDR, mobile telephone network, satellite line, or terrestrial digital network. The present invention encompasses a carrier wave or data signal transmission in which the program code is embodied electronically.

As described in the foregoing, the storage medium managing device preferably further includes correcting means for correcting at least a set of management information other than the primary management information based on the primary management information.

According to the arrangement, at least another set of management information which might contain unsuitable information is corrected based on the primary management information which is highly likely to contain suitable information. Accordingly, more management areas contain suitable management information, which makes suitable management information less likely to be lost.

The storage medium managing device preferably further includes inspecting means for inspecting whether or not the management information is normally recorded in the management areas, wherein the correcting means corrects management information detected to be abnormal by the inspecting means.

According to the arrangement, the correcting means corrects management information determined by the inspecting means not to have been normally recorded. Therefore, the management information which was not normally recorded is given priority in the correcting performed based on the primary management information. Not all the sets of management information need to be corrected. That requires less processing in the correcting of the management information.

The device preferably further includes comparison means for individually comparing the primary management information to the management information other than the primary management information to identify management information containing different information from the primary management information, wherein the correcting means corrects the management information identified by the comparison means.

According to the arrangement, the comparison means individually compares the primary management information to the non-primary management information to identify management information containing different information from the primary management information.

The primary management information is likely to contain suitable information. Therefore, if a set of management information other than the primary management information (hereinafter, the "N-th set of management information") contains different information from the primary management information, the N-th set of management information is likely to have been recorded or updated abnormally. In other words, the N-th set of management information is unlikely to contain suitable information.

Accordingly, if the N-th set of management information has different content from the content of the primary management information, the correcting means corrects the N-th set of management information based on the primary management information.

By giving priority to the correcting of sets of management information that are unlikely to contain suitable information, instead of correcting all the sets of management information, the processing required in the correcting of the management information is reduced.

If the N-th set of management information is not normally read, it is preferable to determine that the N-th set of management information has different content from the content of the primary management information. In addition, if a piece of information contained in the primary management information is missing from the N-th set of management information, it is preferable to determine that the N-th set of management information contains different information from the primary management information.

The device preferably further includes comparison means for individually comparing the primary management information to the management information other than the primary management information to identify older management information than the primary management information, wherein the correcting means corrects the management information identified by the comparison means.

According to the arrangement, the comparison means individually compares the primary management information to the non-primary management information to identify older management information than the primary management information. The correcting means corrects the identified management information.

By giving priority to the correcting of sets of relatively old management information that are unlikely to contain suitable information, instead of correcting all the sets of management information, the processing required in the correcting of the management information is reduced.

The comparison means preferably individually compares an update date and time of the primary management information to an update date and time of the management information other than the primary management information to identify management information updated before the update date and time of the primary management information.

The sets of management information is recorded and updated sequentially starting with an upper-level of management information. If the management information is recorded and updated normally, and there exists a set of management information updated before the update date and time of the primary management information, the management information is unlikely to contain suitable content.

According to the arrangement, the comparison means identifies management information updated before the update date and time of the primary management information. In other words, the comparison means identifies management information that is unlikely to contain suitable content from update date and time. The identifies management information is then corrected.

By giving priority to the correcting of sets of management information that are unlikely to contain suitable content, instead of correcting all the sets of management information, the processing required in the correcting of the management information is reduced.

The correcting means preferably corrects the management information contained in the write-protected storage medium.

Many storage media have a function of restricting recording of new information to the media (write-protection). If the storage medium is write-protected, conventional technology is incapable of additional recording or rewriting of any information (including management information) to the medium. However, even when the medium is write-protected so that the user is prohibited from initiating adding or altering the information contained in the medium, the management information may go missing due to certain external factors (for example, scratches).

According to the arrangement, the correcting means is capable of correcting the management information of the storage medium even when the storage medium is write-protected. That lowers the possibility of the management information going missing.

Preferably, the storage medium is a closed write-once optical disc, and the device further includes recording means for additionally recording the primary management information to the optical disc.

Some optical discs, an example of the storage medium, are closed (finalized) to restrict additional recording and rewriting of data. If the storage medium is closed, conventional technology is incapable of additional recording or rewriting of any management information. However, such an optical disc could possibly lose management information due to some external factors; the possibility is preferably lowered.

According to the arrangement, even if the storage medium is a closed optical disc, the recording means is capable of additionally recording the primary management information to the optical disc. That lowers the possibility of the optical disc losing the management information.

The individual means in the storage medium managing device may be realized using a computer. When that is the case, the scope of the present invention encompasses storage medium managing programs, for the storage medium managing device, which are run on the computer functioning as those means to realize the storage medium managing device and also encompasses computer-readable storage media containing such a program.

INDUSTRIAL APPLICABILITY

The storage medium managing device of the present invention is capable of retaining correct management information for storage media and reduces the risk of missing management information. Hence, when incorporated into an information read/write apparatus, the device renders the information read/write apparatus capable of reading/writing highly reliable management information.

The invention claimed is:

1. A storage medium managing device managing a computer-readable storage medium having a plurality of management areas for containing management information with which data recorded in the storage medium is managed and which is recorded in the management areas in a predetermined sequence, said device comprising a retrieving section for (i) reading out management information first in the predetermined sequence of the management information and determining whether or not that management information is read out normally, and in a case where the management information is determined as not read out normally, the retrieving section carrying out a process of reading out management information next in the predetermined sequence and determining whether or not that management information is read out normally, until the management information is determined as read out normally, and (ii) retrieving the management information determined as read out normally as primary management information, further comprising a correcting section for correcting at least a set of management information other than the primary management information based on the primary management information.

2. The storage medium managing device of claim 1, further comprising an inspecting section for inspecting whether or not the management information is normally recorded in the management areas,
   wherein the correcting section corrects management information detected to be abnormal by the inspecting section.

3. The storage medium managing device of claim 1, further comprising a comparison section for individually comparing the primary management information to the management information other than the primary management information to identify management information containing different information from the primary management information, wherein the correcting section corrects the management information identified by the comparison section.

4. The storage medium managing device of claim 1, further comprising a comparison section for individually comparing the primary management information to the management information other than the primary management information to identify older management information than the primary management information, wherein the correcting section corrects the management information identified by the comparison section.

5. The storage medium managing device of claim 4, wherein the comparison section individually compares an update date and time of the primary management information to an update date and time of the management information other than the primary management information to identify management information updated before the update date and time of the primary management information.

6. The storage medium managing device of claim 1, wherein the correcting section corrects the management information even if the storage medium is write-protected.

7. A non-transitory computer readable storage medium containing a storage medium managing program operating the storage medium managing device of claim 1, said program causing a computer to function as the retrieving section and the correction section.

8. A storage medium managing device managing a computer-readable storage medium having a plurality of management areas for containing management information with which data recorded in the storage medium is managed and which is recorded in the management areas in a predetermined sequence, said device comprising a retrieving section for (i) reading out management information first in the predetermined sequence of the management information and determining whether or not that management information is read out normally, and in a case where the management information is determined as not read out normally, the retrieving section carrying out a process of reading out management information next in the predetermined sequence and determining whether or not that management information is read out normally, until the management information is determined as read out normally, and (ii) retrieving the management information determined as read out normally as primary management information, wherein the storage medium is a closed write-once optical disc, and said device further comprising a recording section for additionally recording the primary management information to the optical disc.

\* \* \* \* \*